United States Patent Office 2,887,482
Patented May 19, 1959

2,887,482

PURIFICATION OF PHENOTHIAZINE

Donald E. Vierling, Pittsburgh, Pa.

No Drawing. Application May 8, 1957
Serial No. 657,707

9 Claims. (Cl. 260—243)

This invention relates to a process for purifying phenothiazine.

Phenothiazine has been used widely as an anthelmintic to destroy internal parasites in cattle, sheep and swine. Since it is taken internally by the host animal, it must, of necessity, be high in purity. Generally, phenothiazine is prepared by the reaction of diphenylamine with sulphur at a relatively high temperature and in the presence of a suitable catalyst, such as aluminum chloride. This method (of preparing phenothiazine) results in a rather crude product having an objectionable odor and color, and containing impurities which may be toxic to the host animal and cause deleterious side reactions. It has been postulated that the impurities may be due to oxygen, sulphur or halogen derivatives of the phenothiazine, or excess reactants or catalyst used. While many proposals for the purification of phenothiazine have been suggested, and, in many instances, put into use, they have usually been expensive and not often very effective in removing the aforementioned impurities.

It is among the objects of the present invention to effectively remove (from crude phenothiazine) the objectionable materials noted hereinbefore and obtain a purified phenothiazine product which can be administered to the host animal with safety and effectiveness.

The invention, then, comprises the features hereinafter fully described and as particularly pointed out in the claims, the following description setting forth in detail certain illustrative embodiments of the invention, these being indicative of but several of a number of ways in which the principles of the invention may be employed.

More specifically, the crude phenothiazine product is prepared in accordance with procedures which are very well-known in the art. Thus, diphenylamine is reacted with sulphur in stoichiometric amounts; that is, one mole of the former to two moles of the latter, in the presence of a controlled amount, say about two percent (2%), of a suitable condensation catalyst, such as aluminum chloride, aluminum bromide, ferric chloride, iodine, copper iodide, etc., at a temperature ranging from about 180° C. to about 200° C., but preferably about 190° C. Hydrogen sulfide is given off during the reaction period; and there is obtained a reaction mixture comprising phenothiazine and the impurities previously mentioned. The impurities which are present generally amount to about one to about five percent by weight of the reaction product, and the melting point thereof varies from 170° C. to about 180° C. Pure phenothiazine is reported in the literature as having a melting point of about 185.1° C.

The crude phenothiazine thus obtained is in a molten state and generally contains impurities in excess of the amount desired, considering the fact that it is to be ingested by animals.

In accordance with the process of the present invention, the crude phenothiazine obtained in the foregoing manner is admixed with silicon dioxide. In order for the silicon dioxide to present an optimum surface area so that it can both absorb and adsorb the impurities at maximum efficiency at the temperatures and pressures employed in the purification step, the amount and size thereof are extremely important. The amount of silicon dioxide employed may vary from about ½ percent to about 50 percent by weight, based on the weight of the crude phenothiazine present, but preferably about 1 percent to about 20 percent by weight. The silicon dioxide, in order to provide sufficient area for the absorption and adsorption must be finely divided, and can have an average particle size varying from about 3½ mesh to about 400 mesh or more, but preferably should be about 10 mesh to about 350 mesh.

After the phenothiazine and silicon dioxide mixture has been prepared, it is heated to a temperature of at least about 300° C., at which point the mixture is still in the molten state with the silicon dioxide dispersed therein. The rate at which the mixture is heated from the temperature at which the phenothiazine was prepared to a temperature of at least about 300° C. is not extremely critical. However, it must be such that the heat absorbed in such time is not so great as to adversely affect the phenothiazine. In general, I have found that a period of at least about 15 to 35 minutes is sufficient to effect the desired heating effect without destroying any appreciable amount of phenothiazine. Although the temperature should be at least about 350° C., it should be no higher than about 550° C., for at the latter temperature an appreciable amount of degradation of phenothiazine occurs. I have found that, preferably, the temperature should be between 350° C. and 450° C.

When a temperature of at least about 300° C. is reached, distillation of the mixture containing the impure phenothiazine is begun. At such temperature, a pressure suitable for distillation of the mixture is employed. While a pressure as high as about atmospheric can be employed, yields at such pressure are relatively low; and, therefore, lower pressures are preferred. A vacuum is preferable, generally as low a vacuum as can be obtained within economic considerations. A vacuum of about 5 millimeters to about 100 millimeters of mercury absolute can effectively be used, preferably a vacuum of about 25 millimeters of mercury absolute. While the time for distillation will, of course, vary and be dependent largely on the many variables involved, I have found that, at about 350° C. and 25 millimeters of mercury, about 12 minutes is sufficient to effect a complete distillation according to the teachings of the present invention. The product thus obtained is free of objectionable odor, is light in color and is generally about 99.998 percent pure by weight, and requires no further treatment. The silicon dioxide, of course, remains behind and can be used again, preferably after regeneration by heating to a temperature sufficiently high to burn off the tars and other carbonaceous materials, such as a temperature of about 1000° C. for 1 hour.

The invention can further be illustrated by reference to the following representative examples, all of which resulted in a product which was very light yellow in color and free of objectionable odor:

Example I 1690 grams of diphenylamine were reacted with 640 grams of sulphur in the presence of iodine at a temperature of 190° C. for 30 minutes; and there was obtained 1900 grams of a crude phenothiazine mixture having a melting point of 178° C. 1000 grams of this crude phenothiazine mixture were mixed with 5 grams of silicon dioxide having an average particle size of 200 mesh; and the resultant mixture was heated over a period of 20 minutes to a temperature of 300° C. When the latter temperature was reached, the resultant mixture was distilled at a vacuum of 5 millimeters of mercury absolute over a period of 10 minutes. There was thus obtained 920 grams of phenothiazine having a melting point of 184.8° C.

*Example II*

1000 grams of the crude phenothiazine product of Example I were mixed with 10 grams of silicon dioxide having an average particle size of 400 mesh; and the resultant mixture was heated over a period of 20 minutes to 350° C. At this latter temperature, the resultant mixture was distilled at a vacuum of 25 millimeters of mercury absolute over a period of 8 minutes. This resulted in 950 grams of phenothiazine having a melting point of 184.9° C.

*Example III*

1000 grams of the crude phenothiazine product of Example I were mixed with 500 grams of silicon dioxide having an average particle size of 3½ mesh; and the resultant mixture was heated over a period of 35 minutes to 550° C. At this latter temperature, the resultant mixture was distilled at a vacuum of 100 millimeters of mercury absolute over a period of 12 minutes. Thus, there was obtained 850 grams of phenothiazine having a melting point of 184.4° C.

*Example IV*

1000 grams of the crude phenothiazine product of Example I were mixed with 200 grams of silicon dioxide having an average particle size of 200 mesh; and the resultant mixture was heated over a period of 15 minutes to 350° C. At this latter temperature, the resultant mixture was distilled at a vacuum of 50 millimeters of mercury absolute over a period of 10 minutes. The result was 910 grams of phenothiazine having a melting point of 184.7° C.

While I have shown and described certain specific embodiments of the present invention, it will be readily understood that I do not wish to be limited exactly thereto, since various modifications may be made without departing from the scope of the invention as defined in the appended claims.

I claim:

1. A process for purifying phenothiazine contaminated with impurities resulting from the reaction of diphenylamine with sulphur in the presence of a catalyst, said method including admixing with said impure phenothiazine silicon dioxide, heating the resultant mixture to a temperature of at least about 300° C., and at said latter temperature, distilling said resultant mixture.

2. A process for purifying phenothiazine contaminated with impurities resulting from the reaction of diphenylamine with sulphur in the presence of a catalyst, said method including admixing with said impure phenothiazine silicon dioxide, heating the resultant mixture to a temperature of about 300° to about 550° C., and at said latter temperature, distilling said resultant mixture.

3. A process for purifying phenothiazine contaminated with impurities resulting from the reaction of diphenylamine with sulphur in the presence of a catalyst, said method including admixing with said impure phenothiazine silicon dioxide, heating the resultant mixture to a temperature of about 350° to about 450° C., and at said latter temperature, distilling said resultant mixture.

4. A process for purifying phenothiazine contaminated with impurities resulting from the reaction of diphenylamine with sulphur in the presence of a catalyst, said method including admixing with said impure phenothiazine about ½ of 1 percent to about 50 percent by weight of silicon dioxide having an average particle size of about 3½ to about 400 mesh, heating the resultant mixture to a temperature of at least about 300° C., and at said latter temperature, distilling said resultant mixture.

5. A process for purifying phenothiazine contaminated with impurities resulting from the reaction of diphenylamine with sulphur in the presence of a catalyst, said method including admixing with said impure phenothiazine about ½ of 1 percent to about 50 percent by weight of silicon dioxide having an average particle size of about 3½ to about 400 mesh, heating the resultant mixture to a temperature of about 300° to about 550° C., and at said latter temperature, distilling said resultant mixture.

6. A process for purifying phenothiazine contaminated with impurities resulting from the reaction of diphenylamine with sulphur in the presence of a catalyst, said method including admixing with said impure phenothiazine about ½ of 1 percent to about 50 percent by weight of silicon dioxide having an average particle size of about 3½ to about 400 mesh, heating the resultant mixture to a temperature of about 350° to about 450° C., and at said latter temperature distilling said resultant mixture.

7. A process for purifying phenothiazine contaminated with impurities resulting from the reaction of diphenylamine with sulphur in the presence of a catalyst, said method including admixing with said impure phenothiazine about ½ of 1 percent to about 50 percent by weight of silicon dioxide having an average particle size of about 10 to about 400 mesh, heating the resulting mixture to a temperature of at least about 300° C., and at said latter temperature, distilling said resultant mixture at a pressure of about 5 to about 100 millimeters mercury absolute.

8. A process for purifying phenothiazine contaminated with impurities resulting from the reaction of diphenylamine with sulphur in the presence of a catalyst, said method including admixing with said impure phenothiazine about ½ of 1 percent to about 50 percent by weight of silicon dioxide having an average particle size of about 10 to about 400 mesh, heating the resultant mixture to a temperature of about 300° to about 550° C., and at said latter temperature, distilling said resultant mixture at a pressure of about 5 to about 100 millimeters of mercury absolute.

9. A process for purifying phenothiazine contaminated with impurities resulting from the reaction of diphenylamine with sulphur in the presence of a catalyst, said method including admixing with said impure phenothiazine about ½ of 1 percent to about 50 percent by weight of silicon dioxide having an average particle size of about 10 to about 400 mesh, heating the resultant mixture to a temperature of about 300° to about 450° C., and at said latter temperature, distilling said resultant mixture at a pressure of about 5 to about 100 millimeters of mercury absolute.

References Cited in the file of this patent

UNITED STATES PATENTS

| 2,295,074 | Britton | Sept. 8, 1942 |
|---|---|---|
| 2,353,292 | Britton | July 11, 1944 |
| 2,415,363 | Mitchell | Feb. 4, 1947 |
| 2,433,658 | Geiger | Dec. 30, 1947 |
| 2,769,002 | Buisson et al. | Oct. 30, 1956 |
| 2,802,857 | Kesslin | Aug. 13, 1957 |

FOREIGN PATENTS

| 612,323 | Great Britain | Nov. 11, 1948 |
|---|---|---|

OTHER REFERENCES

Bonomi: C. A., vol. 47, p. 11656(e) (1953), citing Acta cient. venezolana 4 p. 18 (1953).

Harris: Ind. and Eng. Chem., vol. 41, No. 1, pp. 15–19 (1949).